United States Patent [19]

Harwood et al.

[11] Patent Number: 5,110,876

[45] Date of Patent: May 5, 1992

[54] TRI-BLOCK THERMOPLASTIC ELASTOMERS WITH IMPROVED HIGH TEMPERATURE PROPERTIES

[75] Inventors: H. James Harwood, Stow; Allan S. Jones, Cuyahuga Falls, both of Ohio; Malcolm A. Smook, Wilmington, Del.

[73] Assignee: The West Company, Incoprorated, Phoenixville, Pa.

[21] Appl. No.: 562,468

[22] Filed: Aug. 3, 1990

[51] Int. Cl.$^5$ ............................................. C08F 8/10
[52] U.S. Cl. .............................. 525/332.3; 525/332.9; 525/333.3; 525/359.3
[58] Field of Search .............. 525/332.3, 332.9, 333.3, 525/359.3

[56] References Cited

U.S. PATENT DOCUMENTS 4,677,153  6/1987  Kitahara et al. ................. 525/359.3

*Primary Examiner*—Joseph L. Schofer
*Assistant Examiner*—R. H. Delmendo
*Attorney, Agent, or Firm*—Eugene E. Renz, Jr.

[57] ABSTRACT

A thermoplastic elastomeric block copolymer having terminal polystyrene units and olefin elastomeric mid block units, the copolymer having at least a glass transition temperature increasing amount of naphthoylated substitution on the polystyrene units.

3 Claims, No Drawings

TRI-BLOCK THERMOPLASTIC ELASTOMERS WITH IMPROVED HIGH TEMPERATURE PROPERTIES

FIELD OF THE INVENTION

This invention relates to improved block copolymers generally knows as SEBS, and more particularly to block copolymers with increased glass transition temperatures.

BACKGROUND OF THE INVENTION

Hydrogenated block copolymers such as polystyrenepoly(ethylene-co-butylene)-polystyrene (SEBS) block copolymers are important thermoplastic elastomers. Unfortunately the utility at elevated temperatures is limited by the relatively low glass temperature (Tg) of the polystyrene end segments. Typical SEBS block copolymers lose most of their reinforcing ability above 60°–70° C., even though the Tg of the polystyrene segments is 100° C. A few attempts have been made to improve the performance of SEBS block copolymers by chemical modification, but the vast opportunities that are available to do this have scarcely been investigated.

Benzoylation of SEBS block copolymers has been attempted. Benzoylation of the polystyrene segments in these copolymers did not raise their glass transition temperatures sufficiently so that the polymers would be useful above at least 100° C. These polymers are not able to be employed in medical applications where sterilization is important. Automotive and adhesive applications where strength at high temperature is important are also not possible. It is therefore an object of this invention to provide SEBS block copolymers which are useful above 100° C.

SUMMARY OF THE INVENTION

It has now been discovered that the above and other objects of the present invention may be accomplished in the following manner. Specifically, the invention comprises a thermoplastic elastomeric block copolymer having terminal polystyrene units and olefin elastomeric mid block units. The copolymer has at least a glass transition temperature increasing amount of naphthoylated substitution on the polystyrene units. It is preferred that the substitution is in an amount sufficient to raise the glass transition temperature to at least 120° C. Most preferred are copolymers wherein the amount of said substitution is from 15% to 95%, and even wherein the amount of said substitution is from 30% to 65%.

DETAILED DESCRIPTION OF THE PREFERRED EMBODIMENT

The conditions employed to acylate the polymers were patterned after those reported by Kenyon and Waugh to acylate polystyrene, in the Journal of Polymer Science, Vol. 22, Page 83–88, in 1958. In a typical preparation, a solution of Kraton-G 1652 in $CS_2$ was mixed with naphthoyl chloride and $AlCl_3$ in a nitrogen atmosphere at room temperature. The mixture was stirred for various times to obtain various extents of naphthoylization. The gel that often developed was taken up in tetrahydrofuran and the polymer was isolated by pouring the solution into methanol. The polymer was reprecipitated twice from the tetrahydrofuran solution into methanol. The extents of acylation were easily determined from the aromatic proton resonance patterns of the products. When checked by elemental analysis, good agreement was obtained.

Glass transition temperatures were determined using a DuPont 951 Thermogravimetric Analyzer and a Polymer Laboratories 9122 Differential Mechanical Thermal Analyzer (DMTA) Tensile measurements were made using an Instron Mechanical Tester equipped with an environmental chamber. Microdumbbell test specimens were stamped from approximately 1 mm sheets that were prepared by compression molding at 165° C.

Table I lists the glass transition temperatures measured for samples of Kraton-G ® 1652 that had been naphthoylated to various extents. Kraton is Shell Oil's registered trademark for SEBS type products. The table shows that the Tg of the (E-co-B) block as not affected by naphthoylation of the polystyrene segments but that the latter increases with extent of acylation.

TABLE I
NAPHTHOYLATION SUBSTITUTION OF SEBS

| Percent Substitution | Tg E-co-B | Tg Hard Block |
| --- | --- | --- |
| 0 | −33 | 103 |
| 15 | — | 117 |
| 21 | −31 | 126 |
| 30 | — | 136 |
| 34 | — | 139 |
| 64 | −33 | 151 |

Naphthoylation of Kraton-G 1652 with 1-naphthoyl chloride enabled the Tg of the hard block to be increased to 139° C. when 34 percent substitution was achieved and 151° C. when 64 percent substitution was obtained.

Table II shows data for the parent, 30 percent 1-naphthoylated and 64 percent naphthoylated polymers at 105° for Kraton-G 1652 and for the polymers that have been 1-naphthoylated 15, 30 and 64 percent. The improvement in tensile strength with increasing 1-naphthoylation is readily apparent. The initial modulus of the polymers increases with increasing naphthoylation. This is attributed to an increase in the volume fraction of the hard segments. Table II also shows the stress-strain behavior of the 30% 1-naphthoylated polymer at various temperatures.

TABLE II
PHYSICAL PROPERTIES

| Percent Substitution | Temperature °C. | Tensile Strength Max. MPa |
| --- | --- | --- |
| 0 | 105 | 0.4 |
| 15 | 105 | 1.2 |
| 30 | 105 | 4 |
| 64 | 105 | 10.5 |
| 30 | 25 | 33 |
| 30 | 63 | 21 |
| 30 | 90 | 6 |
| 30 | 125 | 1 |

Naphthoylation of the styrene units in Kraton-G enhances their usefulness at high temperatures. The reaction has been found to occur without main chain degradation.

What is claimed is:

1. A thermoplastic elastomeric block copolymer having terminal polystyrene units and elastomeric polyolefin mid block units, said copolymer having an amount of naphthoylated substitution on said polystyrene units, wherein the amount of said substitution is from 15% to 95% of said polystyrene units.

2. The copolymer of claim 1, wherein said substitution is in an amount sufficient to raise the glass transition temperature of said polystyrene units to at least 120° C.

3. The copolymer of claim 1, wherein the amount of said substitution is from 30% to 65% of said polystyrene units.

* * * * *